Sept. 28, 1943.     J. M. HANSEN     2,330,422
MACHINE FOR TREATING EGG WHITES, ETC
Filed April 15, 1940     2 Sheets-Sheet 1
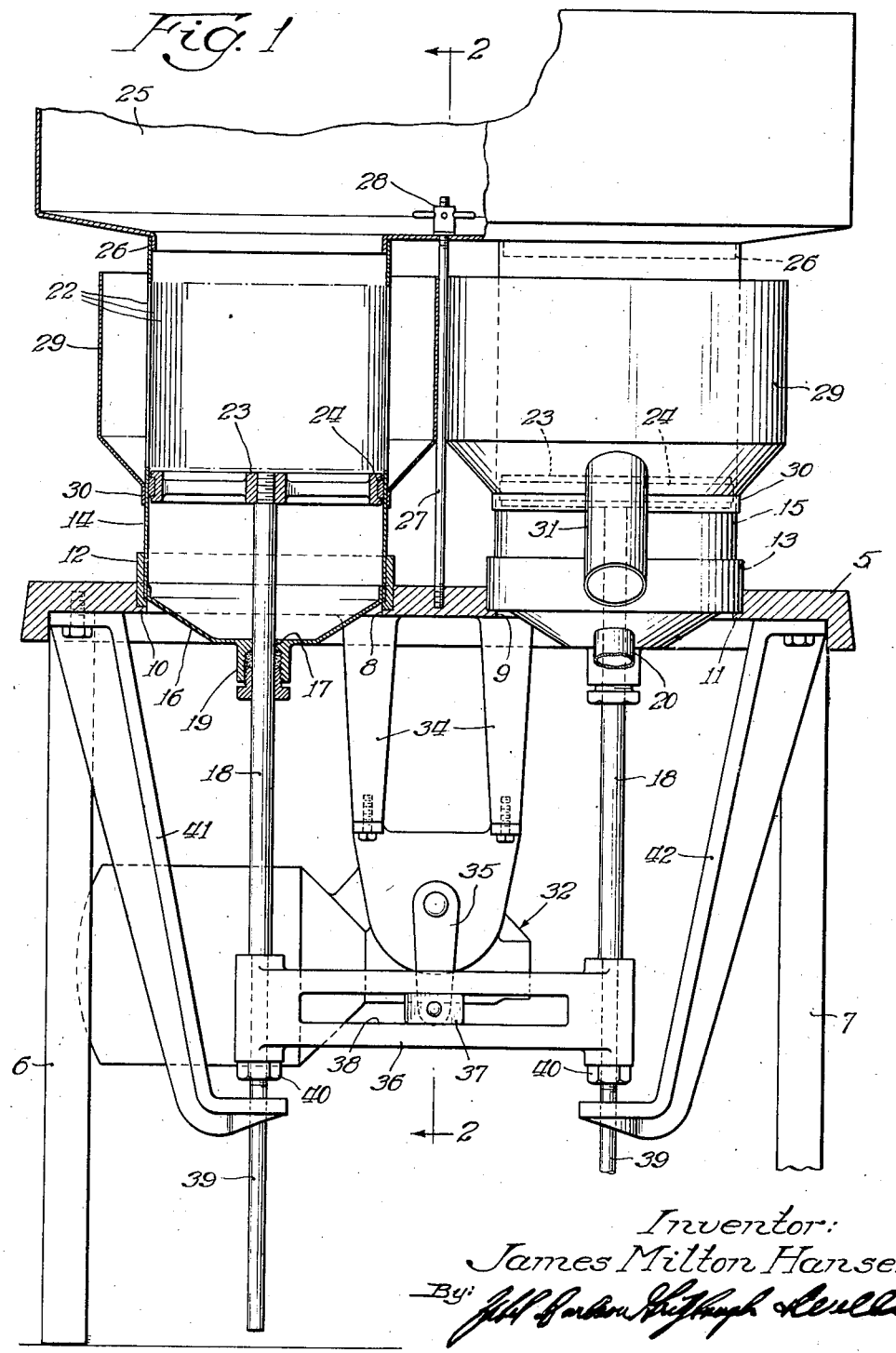
Inventor:
James Milton Hansen Sept. 28, 1943.  J. M. HANSEN  2,330,422
MACHINE FOR TREATING EGG WHITES, ETC
Filed April 15, 1940    2 Sheets-Sheet 2
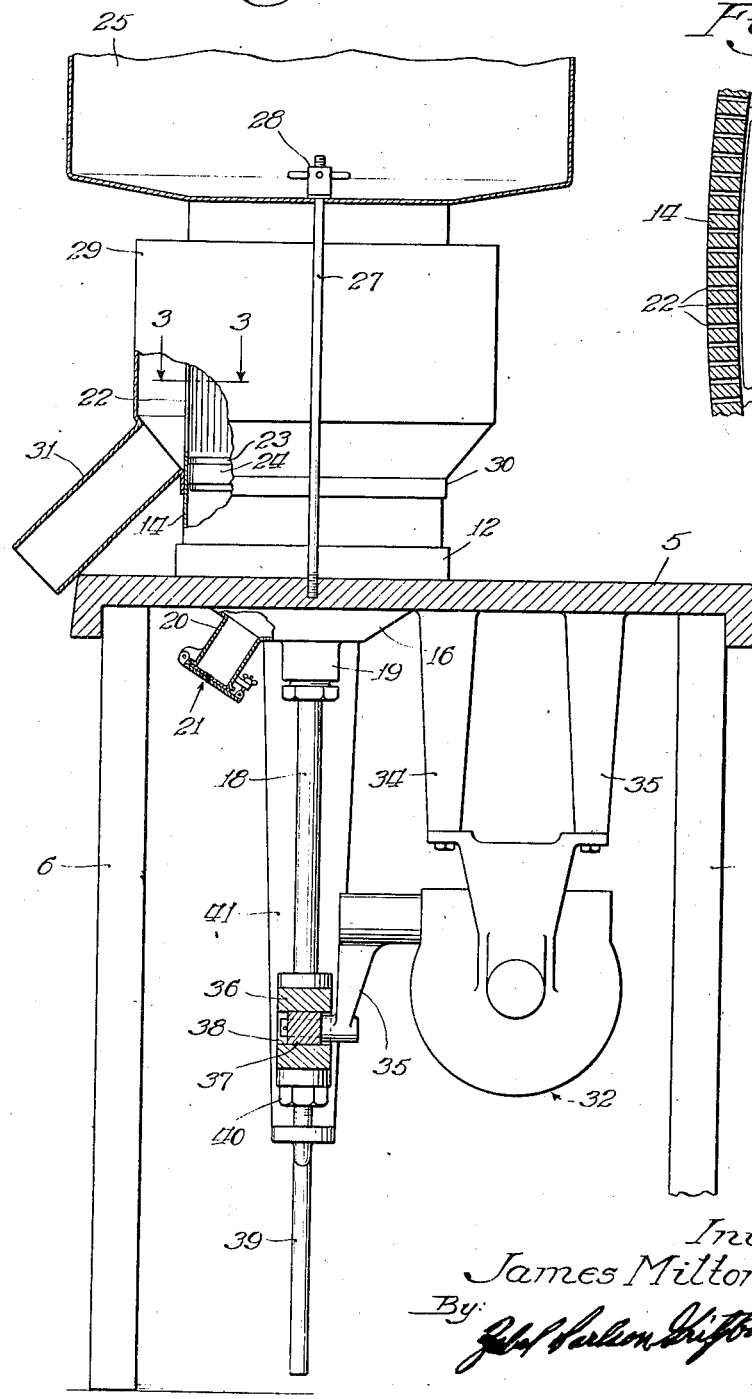
Inventor:
James Milton Hansen Patented Sept. 28, 1943

2,330,422

UNITED STATES PATENT OFFICE 2,330,422

MACHINE FOR TREATING EGG WHITES, ETC.

James Milton Hansen, Park Ridge, Ill.

Application April 15, 1940, Serial No. 329,754

5 Claims. (Cl. 210—151)

The present invention relates to means for straining eggs. It is particularly directed toward a device which is adapted for the straining of egg whites to remove such materials as broken shells, blood spots and chalaza. In the separation of egg white for various purposes, the chalaza in the egg tends to go with the egg white, rather than with the yolk, and, being of a hard, stringy nature, it lowers the quality of the product. Of course the presence of broken shells and large blood spots is also objectionable in the product.

According to the present invention, means are provided whereby these objectionable substances may be readily strained out in the egg whites in a manner which avoids the clogging of a strainer, thus enabling the apparatus to be kept in continuous operation for long periods of time. The apparatus provides a straining means which is actually kept clean and in position to handle the maximum amount of material during its entire operation. I have also found that the present apparatus, because of its nature, eliminates the necessity of providing any appreciable pressure on the egg whites in order to pass them through the strainer, and this, in itself, facilitates the separation of the objectionable materials from the egg whites.

It is the principal purpose of the present invention to provide a straining apparatus wherein the egg whites are passed through the strainer and the objectionable materials such as broken shells, chalaza, and the like, are continuously and rapidly removed from the strainer while it is in operation and carried down out of the way of the strainer and are accumulated so that they may be removed at relatively infrequent intervals.

The features and advantages of the present invention will appear more fully as the description proceeds, reference being had to the accompanying drawings wherein a preferred form of the invention is shown. It is to be understood, however, that the drawings and description are illustrative only, and are not to be taken as limiting the invention except insofar as it is limited by the claims.

In the drawings, Fig. 1 is a view partly in side elevation and partly in section of a machine embodying my invention;

Fig. 2 is a sectional view taken substantially on line 2—2 of Fig. 1, certain parts of the apparatus being broken away for the sake of clearness, and Fig. 3 is an enlarged fragmentary sectional view taken substantially on the line 3—3 of Fig. 2.

Referring now in detail to the drawings, the present invention is embodied in an egg straining device of the character hereinbefore generally described. The device, as shown, comprises a supporting table 5 which may be supported by suitable standards or legs such as 6 and 7. The table is provided with two apertures 8 and 9. The apertures 8 and 9 have ledges 10 and 11 adapted to receive supporting rings 12 and 13 for two strainer cylinders 14 and 15.

Each strainer cylinder has a bottom portion 16 which is provided with a central opening 17 through which a shaft 18 extends. A stuffing box 19 is provided around each shaft 18. Each of the bottom portions 16 is provided with a drain outlet 20 which, in turn, is provided with a suitable valve 21. The valve shown herein is intended to be merely illustrative of any suitable valve construction which will serve the purpose of opening the outlet 20 wide to permit quick drainage of the contents of the strainer cylinder.

Each strainer cylinder is provided at a substantial distance above the bottom thereof with a multiplicity of vertically running slots 22 which slots are carefully cut at uniformly spaced intervals throughout the circumference of the cylinder. The size of the slots may be varied within certain limits to obtain the most suitable results. I have found, however, that slots of 16/ to 22/1000 inch width are satisfactory for my purpose. The cylinder wall must be of sufficient thickness to provide the necessary rigidity. I have used cylinder wall thicknesses of approximately one-eighth inch where the cylinders are in the neighborhood of one foot in diameter. The slots are carefully finished, particularly on the inner edges so as to be smooth and free of any jagged or sharp edges that would tend to cut the chalaza into fine particles which could pass through the strainer.

On the upper ends of the shafts 18 I provide readily removable spiders 23 which carry wiping rings 24 at the periphery thereof. The wiping rings are of such diameter as to ride smoothly on the inner surface of the cylinder without binding. The rings are preferably of a highly polished, non-corrosive material such as chromium plated steel. The material of the cylinders may, of course, be any suitable material for the desired purpose. In view of the difficulty in cutting the slots therein, I have found that a softer material such as brass is preferred to a stainless steel or like material. This difficulty of cutting the slots, however, may be overcome by proper machine methods, in which case it would be more desirable to use a non-corrosive material such as stainless steel.

The upper ends of the cylinders 14 and 15 serve as supports for a loading tank 25 which is provided with two depending flanges 26, one for each cylinder, the flanges 26 being adapted to fit inside the upper ends of the cylinders in the manner shown in Fig. 1. The tank 25 is secured in place by means of a rod 27 which is secured in the table 5 and extends up through the tank to receive a clamping nut 28.

In order to carry off the egg white which passes through the straining cylinders, I provide around each cylinder a shell 29. The shell 29 is secured to the cylinder by a band 30 at its lower edge, this band being spaced below the lower ends of the slots 22. An outlet tube 31 is provided for each cylinder 29 so as to readily drain out the egg whites.

The wiping rings 24 are adapted to be vertically reciprocated by the shafts 18 in a continuous manner from a position slightly below the lower ends of the slots 22 to the tops of the slots. The mechanism shown herein for reciprocating the shafts 18 comprises a power unit 32 consisting of a suitable electric motor and a gear reduction unit combined. This power unit is suspended by brackets 33 and 34 from the table 5. A crank 35 is connected to a cross head 36 by means of a sliding block 37 working in a slot 38 of the cross head. The cross head 36 is fastened on the shafts 18, the shafts being provided with reduced lower portions 39 to receive the cross head. Suitable means such as the nuts 40 clamp the cross head in place on the shafts 18. The table 5 is also provided with guide brackets 41 and 42 for the reduced portions of the shafts 18.

The device as shown and described herein illustrates the strainer as composed of a plurality of vertical cylinders. It is to be understood, however, that the invention is not limited to the use of the slots and the wiping means in a vertical cylinder. The fundamental straining mechanism shown herein may be embodied in constructions of widely different form wherein the slots are not vertical and wherein the strainer body in which the slots are located is not a cylinder. In this respect, it is only necessary to provide the proper smooth edge slots and means to wipe the slots lengthwise in order to obtain the advantages of my improvements in strainers.

The operation of the device is as follows: When the power unit 32 is started up, the cross head is slowly reciprocated vertically so as to move the spiders 23 and their wiping rings slowly up and down within the cylinders 14 and 15. The egg white to be strained is poured into the tank 25, thus filling the cylinders 14 and 15 and immediately the egg white begins to pass through the narrow slots 22. As the egg white passes through the slots which are too narrow for the chalaza, this material and the broken egg shells and the like are held back by the narrow slots. The wiping ring 24, in moving vertically along the slots, tends to move the chalaza and other materials up or down lengthwise of the slot, and in so moving it, wipes the inner surfaces of the slots clear so as to avoid clogging of the straining cylinders. There is not much difference in weight between the chalaza and the egg white. There is, however, sufficient difference to cause the chalaza to settle to the bottom of the cylinder. The slow up and down movement of the wiping rings thus gradually clears the chalaza from the egg white and works it down into the bottom of the cylinder. The only pressure existing that would tend to force the chalaza through the slots in the cylinder is the pressure of the egg white itself, and this is a comparatively slight pressure because of the small head of material above the slots. This lack of pressure is of considerable advantage in aiding the wiping ring to keep the slots free.

The capacity of the apparatus for handling egg whites is of course variable by changing the diameters of the straining cylinders. It is possible, therefore to have a machine of any reasonable desired capacity merely by making the cylinders of the proper size. The shells 29 perform two useful functions in addition to providing for the outlet of the strained egg white. They enable the egg white to pile up exteriorly of the straining cylinders to, in a measure, offset the excessive pressure that might occur at the bottom ends of the slots. They further serve as a protecting means for the slotted part of the cylinder to prevent the cylinder from being damaged in the cleaning thereof.

One advantage of the present structure, particularly in the straining of egg whites, lies in the fact that by providing elongated slots the product has a more consistent uniform body. The egg whites are allowed to pass through the entire length of a slot without any cutting or breaking up effect. Such is not true of screens provided with openings small enough in both dimensions to trap the chalaza.

The entire construction is such that it is a simple matter to separate the parts for cleaning. The tank 25 can be removed by unscrewing the clamping nut 28. The spiders 23 can be removed very quickly, whereupon it is a simple matter to lift out the spiders and their rings and then to lift the cylinders 14 and 15 vertically from the table 5 and the shafts 18.

From the foregoing description it is believed that the construction and operation of this device will be readily apparent to those skilled in this art. Having thus described my invention, what I claim as new and desire to secure by Letters Patent is:

1. An egg straining apparatus comprising a straining cylinder having longitudinally running slots in the wall thereof, said slots being of such dimensions as to block the passage of the chalaza of the eggs and fragments of shell of appreciable size, the edges of said slots which first encounter the egg white being smoothed to avoid cutting the chalaza, a wiper extending transversely across the receiving ends of the slots but not into the slots and traveling lengthwise of said slots along the surface of said cylinder, and means to reciprocate said wiper.

2. An egg filtering apparatus of the character described comprising a strainer having a multiplicity of elongated slots arranged side by side therein and a wiper extending transversely across the receiving ends of the slots but not into the slots together with means for moving the wiper continuously lengthwise of the slots, thereby clearing the slots of the material strained out.

3. An egg straining apparatus comprising a loading tank, a strainer receiving material from said loading tank and comprising a sheet member provided with spaced parallel slots having smooth edges on the egg white receiving side, together with a wiper extending transversely across the receiving ends of the slots but not into the slots and mounted for movement lengthwise of the slots along the egg receiving side of said member and means for moving the wiper lengthwise of the slots during the straining operation.

4. An egg straining apparatus comprising a straining cylinder having longitudinally running slots in the wall thereof, said slots being of such dimensions as to block the passage of the chalaza of the eggs and fragments of shell of appreciable size, the edges of said slots which first encounter the egg white being smoothed to avoid cutting the chalaza, and a wiper travelling lengthwise of said slots, said wiper comprising a ring in said cylinder, a shaft carrying the ring, and means to reciprocate said shaft.

5. An egg straining apparatus comprising a straining cylinder having longitudinally running slots in the wall thereof, said slots being of such dimensions as to block the passage of the chalaza of the eggs and fragments of shell of appreciable size, the edges of said slots which first encounter the egg white being smoothed to avoid cutting the chalaza, a shell surrounding the slotted part of said cylinder and secured to the cylinder below the slots, said shell providing a trough to receive the materials passing through the slots, said shell having a drain outlet, and a wiper travelling lengthwise of said slots, said wiper comprising a ring in said cylinder, a shaft carrying the ring, and means to reciprocate said shaft.

JAMES MILTON HANSEN.